(12) United States Patent
Yang et al.

(10) Patent No.: US 7,379,416 B2
(45) Date of Patent: May 27, 2008

(54) FORWARD PACKET DATA CHANNEL WITH PARALLEL SUB-PACKETS

(75) Inventors: Hong Kui Yang, San Diego, CA (US); Stanislaw Czaja, Cardiff, CA (US)

(73) Assignee: LSI Logic Corporation, Milpitas, CA (US)

( * ) Notice: Subject to any disclaimer, the term of this patent is extended or adjusted under 35 U.S.C. 154(b) by 1101 days.

(21) Appl. No.: 10/099,815

(22) Filed: Mar. 13, 2002

(65) Prior Publication Data

US 2003/0174642 A1  Sep. 18, 2003

(51) Int. Cl.
*H04J 11/00* (2006.01)
*H04J 3/00* (2006.01)

(52) U.S. Cl. ....................... 370/208; 370/345

(58) Field of Classification Search ............ None
See application file for complete search history.

(56) References Cited

U.S. PATENT DOCUMENTS 6,775,254 B1 * 8/2004 Willenegger et al. ....... 370/329

2002/0150040 A1 * 10/2002 Tong et al. .................. 370/216
2002/0176362 A1 * 11/2002 Yun et al. .................... 370/236

OTHER PUBLICATIONS

Wu et al.; "Non-Complete Puncture Based Re-transmission for HARQ", *3GPP2 TSG-2 Working Group 5*, Nortel Networks, Nov. 5, 2001, pp. 1-11.
LG Electronics et al.; "Updated Joint Physical Layer Proposal for 1xEV-DV", *3GPP2-C50-20010611-009*, Jun. 11, 2001, pp. 186-191.

* cited by examiner

*Primary Examiner*—Huy D. Vu
*Assistant Examiner*—Daniel Ryman
(74) *Attorney, Agent, or Firm*—K & L Gates LLP

(57) ABSTRACT

A method of time division multiplexing for a forward data packet channel includes encoding parallel data sub-packets into parallel streams of turbo codes; interleaving each of the parallel streams of turbo codes to generate parallel streams of quasi-complementary turbo codes; modulating the parallel streams of quasi-complementary turbo codes to generate parallel streams of modulated data symbols; and multiplexing the parallel streams of modulated data symbols by one of multiplexing and non-complete puncturing to generate a single stream of modulation symbols.

10 Claims, 2 Drawing Sheets

FORWARD PACKET DATA CHANNEL WITH PARALLEL SUB-PACKETS

FIELD OF THE INVENTION

The present invention relates generally to data transmission protocols for time division multiplexed (TDM) digital communications. More specifically, but without limitation thereto, the present invention relates to a time division multiplexed digital communications protocol for transmitting parallel sub-packets within a single time frame.

BACKGROUND OF THE INVENTION

A forward data packet channel (F-PDCH) is used to transmit encoded data in data packets to multiple mobile stations in a time division multiplexed fashion. Disadvantageously, the forward data packet channel currently supports only a single data sub-packet within a time frame. The time frame may be varied as a multiple of a time slot. A time slot has a typical duration of about 1.25 milliseconds. A sub-packet is a set of coded symbols obtained from a turbo coded encoder packet. Using previously defined protocols, sub-packets derived from the same encoder packet may be transmitted with different modulation formats, effective code rates, and in up to eight time slots.

SUMMARY OF THE INVENTION

In one aspect of the present invention, a forward data packet channel includes means for encoding parallel data sub-packets into parallel streams of turbo codes; means for interleaving each the parallel streams of turbo codes to generate parallel streams of quasi-complementary turbo codes; means for modulating the parallel streams of quasi-complementary turbo codes to generate parallel streams of modulated data symbols; and means for combining the parallel streams of modulated data symbols by one of multiplexing and non-complete puncturing to generate a single stream of modulation symbols.

In another aspect of the present invention, a method of time division multiplexing for a forward data packet channel includes encoding parallel data sub-packets into parallel streams of turbo codes; interleaving each of the parallel streams of turbo codes to generate parallel streams of quasi-complementary turbo codes; modulating the parallel streams of quasi-complementary turbo codes to generate parallel streams of modulated data symbols; and multiplexing the parallel streams of modulated data symbols by one of multiplexing and non-complete puncturing to generate a single stream of modulation symbols.

DESCRIPTION OF THE SEVERAL VIEWS OF THE DRAWINGS

The present invention is illustrated by way of example and not limitation in the accompanying figures, in which like references indicate similar elements throughout the several views of the drawings, and in which.

Elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF THE ILLUSTRATED EMBODIMENTS

In one aspect of the present invention, a forward data packet channel includes means for encoding parallel data sub-packets into parallel streams of turbo codes; means for interleaving each the parallel streams of turbo codes to generate parallel streams of quasi-complementary turbo codes; means for modulating the parallel streams of quasi-complementary turbo codes to generate parallel streams of modulated data symbols; and means for combining the parallel streams of modulated data symbols by one of multiplexing and non-complete puncturing to generate a single stream of modulation symbols.

Figure 1:
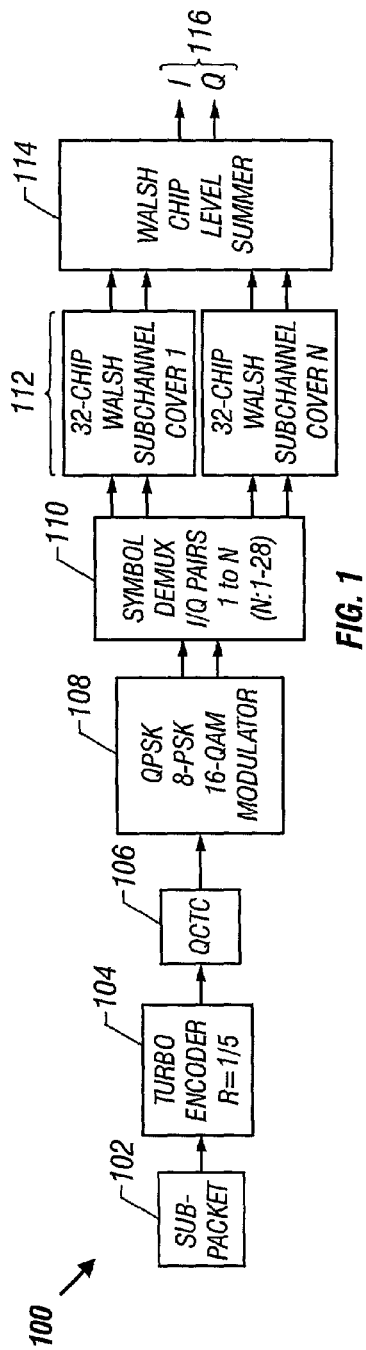
FIG. 1 illustrates a block diagram of a forward packet data channel of the prior art.

FIG. 1 illustrates a block diagram of a forward packet data channel (FPDCH) 100 of the prior art. Shown in FIG. 1 are a sub-packet 102, a turbo encoder 104, a quasi-complementary code interleaver 106, a symbol modulator 108, a symbol demultiplexer 110, Walsh sub-channel cover functions 112, and a Walsh summer 114.

The sub-packet 102 contains a block of information bits and parity bits from a user, for example, a mobile station (MS). The turbo encoder 104 encodes the block of information bits from the data sub-packet 102 into a stream of turbo codes. A turbo code typically consists of a concatenation of two or more systematic codes. A systematic code generates two bits from an information bit, or systematic bit, of which one of the two bits is identical to the information bit. The systematic codes are typically recursive convolutional codes, called constituent codes. Each constituent code is generated by an encoder that associates at least one coded data bit with one systematic or information bit. The systematic bit is one bit of a stream of digital data to be transmitted. The coded data bit is generated by the encoder from a linear combination, or convolution, of the systematic bit and one or more previous systematic bits.

The quasi-complementary turbo code interleaver 106 interleaves the stream of turbo codes into a stream of quasi-complementary turbo codes. The stream of quasi-complementary turbo codes is typically scrambled by a scrambler, however, the scrambler is omitted in this example.

The modulator 108 modulates the stream of quasi-complementary turbo codes to generate a stream of in-phase and quadrature sample pairs. A variety of modulation schemes may be used to implement the modulator 108, for example, quadrature phase shift keying (QPSK), 8-phase shift keying (8-PSK), and 16-point quadrature amplitude modulation (16-QAM).

The symbol demultiplexer 110 divides the stream of in-phase and quadrature sample pairs into a number of code channels, typically up to 28. The code channels are covered, or spread, by a set of orthogonal Walsh functions 112. The length of the Walsh code is 32. Each bit of the modulated symbols is spread by the 32-bit Walsh code. The Walsh-covered sample pairs are summed from each of the Walsh functions 112 by the Walsh summer 114 to generate a single stream of summed in-phase and quadrature sample pairs 116. The stream of summed in-phase and quadrature sample pairs is then processed by spread spectrum techniques to generate the transmitted signal for the forward packet data channel (FPDCH) 100.

A disadvantage of the forward packet data channel (FPDCH) 100 is that only one sub-packet 102 is transmitted per time frame. Two methods for multiplexing modulation symbols into a single stream of symbols are presented by 3GPP2 C50-20011015-010, Third Generation Partnership Project 2, "Updated Joint Physical Layer Proposal for 1×EV_DV", L3NQS (Lucent, Qualcomm, Samsung, LG Electronics, LSI Logic, and Nortel), Jun. 11, 2001, Vancouver, BC, Canada. In the forward packet data channel of the present invention, parallel sub-packets from multiple users may advantageously be supported within a single time frame.

Figure 2:
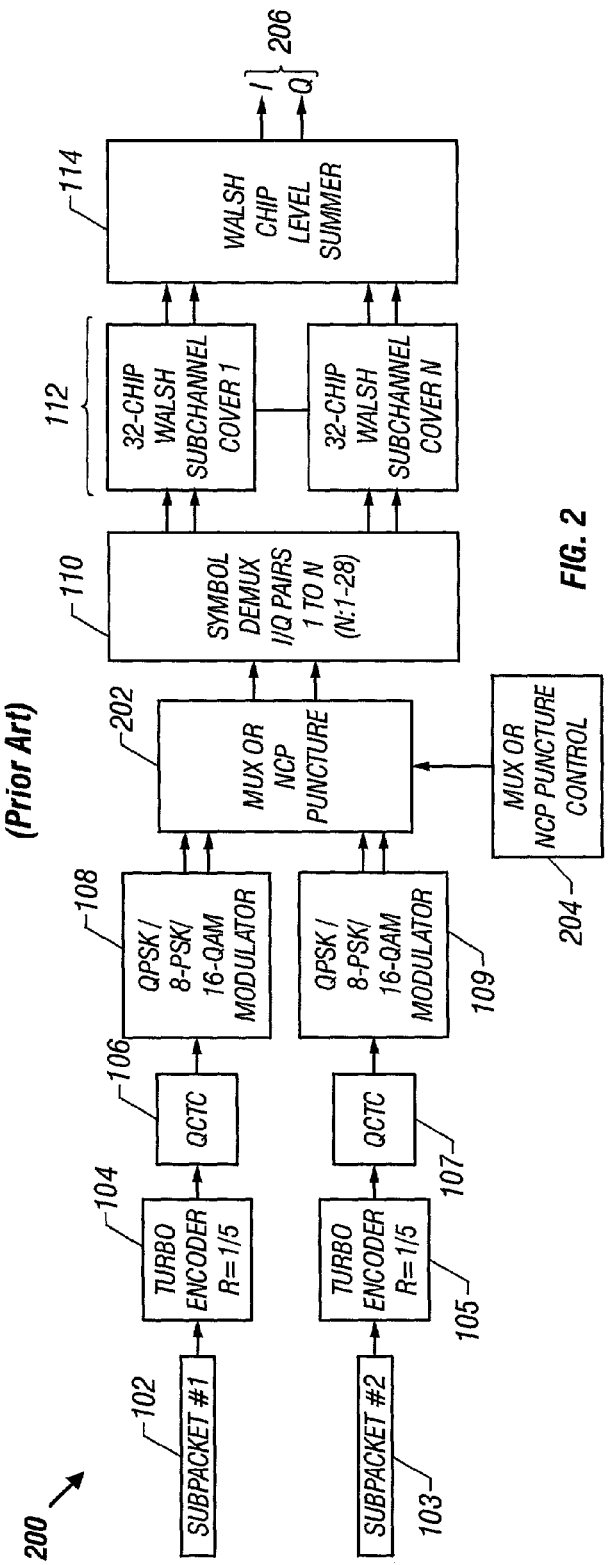
FIG. 2 illustrates a block diagram of a forward packet data channel according to an embodiment of the present invention in which two sub-packets are transmitted in a single frame.

FIG. 2 illustrates a block diagram of a forward packet data channel 200 according to an embodiment of the present invention in which two sub-packets are transmitted in a single frame. Shown in FIG. 2 are a first sub-packet 102, a second sub-packet 103, a first turbo encoder 104, a second turbo encoder 105, a first quasi-complementary code interleaver 106, a second quasi-complementary code interleaver 107, a first symbol modulator 108, a second symbol modulator 109, a multiplexer/non-complete puncture (NCP) function 202, a multiplexer/non-complete puncture (NCP) function controller 204, a symbol demultiplexer 110, Walsh sub-channel cover functions 112, and a Walsh summer 114.

The first turbo encoder 104, the second turbo encoder 105, the first quasi-complementary code interleaver 106, the second quasi-complementary code interleaver 107, the first symbol modulator 108, the second symbol modulator 109, the symbol demultiplexer 110, the Walsh sub-channel cover functions 112, and the Walsh summer 114 may be implemented according to well known techniques as described above with regard to FIG. 1. All available Walsh codes are shared between the first sub-packet 102 and the second sub-packet 103. The first sub-packet 102 and the second sub-packet 103 may be used, for example, to support two separate users in parallel or to support two sub-packets for a single user within the same time frame. One of the sub-packets may also be used to re-transmit a previously transmitted sub-packet that was not successfully decoded by the mobile station that received the transmitted sub-packet.

The multiplexer/non-complete puncture (NCP) function 202 can either multiplex the first sub-packet 102 and the second sub-packet 103 or puncture the second sub-packet 103 into the first sub-packet 102. In the multiplexed mode of operation, parallel users or parallel sub-packets for a single user may be supported. In the non-complete puncturing (NCP) mode of operation, the non-complete puncture hybrid automatic request (NCP-HARQ) function may be performed to repeat the transmission of a sub-packet that was not successfully decoded by the receiving station.

The ratio of the number of information bits to the number of coded parity bits in the transmitted signal is defined as the code rate. For example, a code rate of 1/3 indicates that three coded parity bits are transmitted with each information bit. Repeated information bits and some of the coded parity bits in the constituent codes may be removed, or "punctured", according to a puncturing pattern before transmitting to increase the data rate. The puncture pattern is selected by the multiplexer/non-complete puncture (NCP) function controller 204. A non-complete puncture pattern may be selected according to well known techniques, for example, as described in 3GPP2 C50-20011105-025, Third Generation Partnership Project 2, "Non-complete Puncture Based Retransmission for HARQ", Kuaui, Nov. 5, 2001. An advantage of non-complete puncturing is that the second data sub-packet 103 may be punctured into the first data sub-packet 102 without occupying the payload of the first data sub-packet 102, thereby increasing the throughput. The present invention may also be practiced with other multiplexing and puncturing methods to suit specific applications. In the example shown, two parallel sub-packets are combined into a single data stream of in-phase and quadrature sample pairs 206, however, the invention may also be practiced with additional parallel sub-packets to generate a single data stream in other applications.

In the current 1×EV-DV (1×Evolution-Data and Voice) specification, there are two forward control channels: the primary packet data control channel (PPDCCH) and the secondary packet data control channel (SPDCCH). Since the new proposal supports up to two packet users within a single frame, the secondary packet data control channel (SPDCCH) may be modified with the addition of a one-bit MODE field and a three-bit sub-packet size (SSS) field. A secondary packet data control channel modified accordingly is referred to herein as SPDCCH-1. An exemplary format for SPDCCH-1 is defined in Table 1 below.

TABLE 1

| FIELD | BIT LENGTH |
| --- | --- |
| MAC ID | 6 |
| ARQ Channel ID | 2 |
| Encoder Packet Size | 3 |
| Sub-Packet ID | 2 |
| Mode | 1 |
| Sub-Slot Size (SSS) | 3 |
| Total | 17 |

In Table 1, "MAC" is the abbreviation for media access control, and "ARQ" is the abbreviation for automatic request. The one-bit mode field is used to allow sharing of SPDCCH-1 between TDM/TDM and TDM/CDM operating modes. In the TDM/TDM mode, the three-bit Sub-Slot Size field is defined as shown in Table 2 below.

TABLE 2

| | SPDCCH-1 TIME FRAME | | | |
| --- | --- | --- | --- | --- |
| SUB-SLOT SIZE | 1 | 2 | 3 (CRC state 0) | 4 (CRC state 1) |
| 000 | 0.5 | 1.125 | 2.25 | 4.5 |
| 001 | 0.625 | 1.25 | 2.5 | 5 |
| 010 | 0.75 | 1.375 | 2.75 | 5.5 |
| 011 | 0.875 | 1.5 | 3 | 6 |
| 100 | 1 | 1.625 | 3.25 | 6.5 |
| 101 | | 1.75 | 3.5 | 7 |
| 110 | | 1.875 | 3.75 | 7.5 |
| 111 | | 2 | 4 | 8 |

The sum of the sub-slot sizes (total frame size) from any two sub-packets is always an integer. An important feature of the present invention is the variable number of sub-slots in the secondary packet data control channel (SPDCCH-1). The variable sub-slot sizes have a resolution of 1/8 for a 1- to 2-slot time frame, 1/4 for a 4-slot time frame, and 1/2 for an 8-slot time frame. For example, the previous forward packet data channel transmits in four or eight slots. By allowing 3.5 or 5.5 slot transmission, only 0.5 or 2.5 slots are available respectively for the second user. Without a variable slot size, a 5-slot (4+1) or a 12-slot (8+4) size would be required to transmit the same data. In this example, the variable slot size feature realizes a savings of 20 percent or 67 percent, respectively.

Additionally, a second secondary packet data control channel (SPDCCH-2) is required for the second packet user. The second secondary packet data control channel is identical to the currently defined SPDCCH and does not require the additional Mode and sub-slot-size fields, since the second packet user occupies the remainder of the frame. The second packet user is only supported when the actual sub-slot size is less than the frame size.

In the case of parallel users, the SPDCCH-1 should be transmitted at the power level necessary to support the user with the lower channel quality indicator (C/I). Accordingly, the power of SPDCCH-1 is controlled by the user having the lower channel quality indicator, while SPDCCH-2 is controlled by the user having the higher channel quality indicator. By associating the position of the user within the frame according to the user channel quality indicator, the transmission power of SPDCCH-2 may be reduced, because the user having the lower channel quality indicator does not need to decode SPDCCH-2.

Additionally, the user associated with the first data sub-packet always occupies at least one-half of the total time frame according to the following rules:

$$\text{USER\_1} + \text{USER\_2} = L \quad (1)$$

$$\text{USER\_1} \geq \text{USER\_2}$$

where USER_1 is the portion of the time frame allocated to the first user, USER_2 is the portion of the time frame allocated to the second user, and L is the total duration of the time frame. The rules (1) allocate the shorter portion of the time frame to the second user with the higher channel quality indicator. This means that the first user is assigned to a channel having a lower mobile station channel quality indicator (C/I MS), while the second user is assigned to a channel having a higher mobile station channel quality indicator. To further increase efficiency, SPDCCH-2 is not transmitted when only one packet user is serviced.

The achieved coding rates and the range of effective coding rates (MCS) yields a step size of about 0.1 in effective coding rate for 16-QAM. For example, in the case of a packet size of 3840, the Eb (received energy per bit) /Nt (effective noise power spectrum density) requirement difference is 2 dB when the effective coding rate is changed from 0.6 to 0.8. The coding rate step size of 0.1 corresponds to a 1 dB Eb/Nt requirement.

The present invention provides a time division multiplexed mode for the 1×EV-DV forward packet data channel (F-PDCH) that supports multiple users within a single time frame while providing a full range of effective coding rates (MCS) using time division multiplexed sub-slots and a full range of frame sizes (1, 2, 4, and 8 slots). Also, all available Walsh code rates are used to take advantage of multi-code gain. In addition to providing support for two packet users per time frame, the TDM/TDM forward packet data channel can support up to 32 modulation and coding schemes per data sub-packet for each Walsh code length. The modified secondary packet data control channel may be implemented by the addition of the mode field and the sub-slot size field to the previously defined secondary packet data control channel.

Advantages of the modified second secondary packet data control channel compared to the prior art include similar or better granularity of effective coding rates compared to TDM/CDM, no additional complexity associated with dynamic allocation of the Walsh space at the base station (BS) and the mobile station (MS), same scheduling mechanism as used in the current 1×EV-DV simulations, and improved support of services requiring low latency, i.e., near real time, compared to TDM/CDM.

In another aspect of the present invention, a method of time division multiplexing for a forward data packet channel includes encoding parallel data sub-packets into parallel streams of turbo codes; interleaving each of the parallel streams of turbo codes to generate parallel streams of quasi-complementary turbo codes; modulating the parallel streams of quasi-complementary turbo codes to generate parallel streams of modulated data symbols; and multiplexing the parallel streams of modulated data symbols by one of multiplexing and non-complete puncturing to generate a single stream of modulation symbols.

Figure 3:
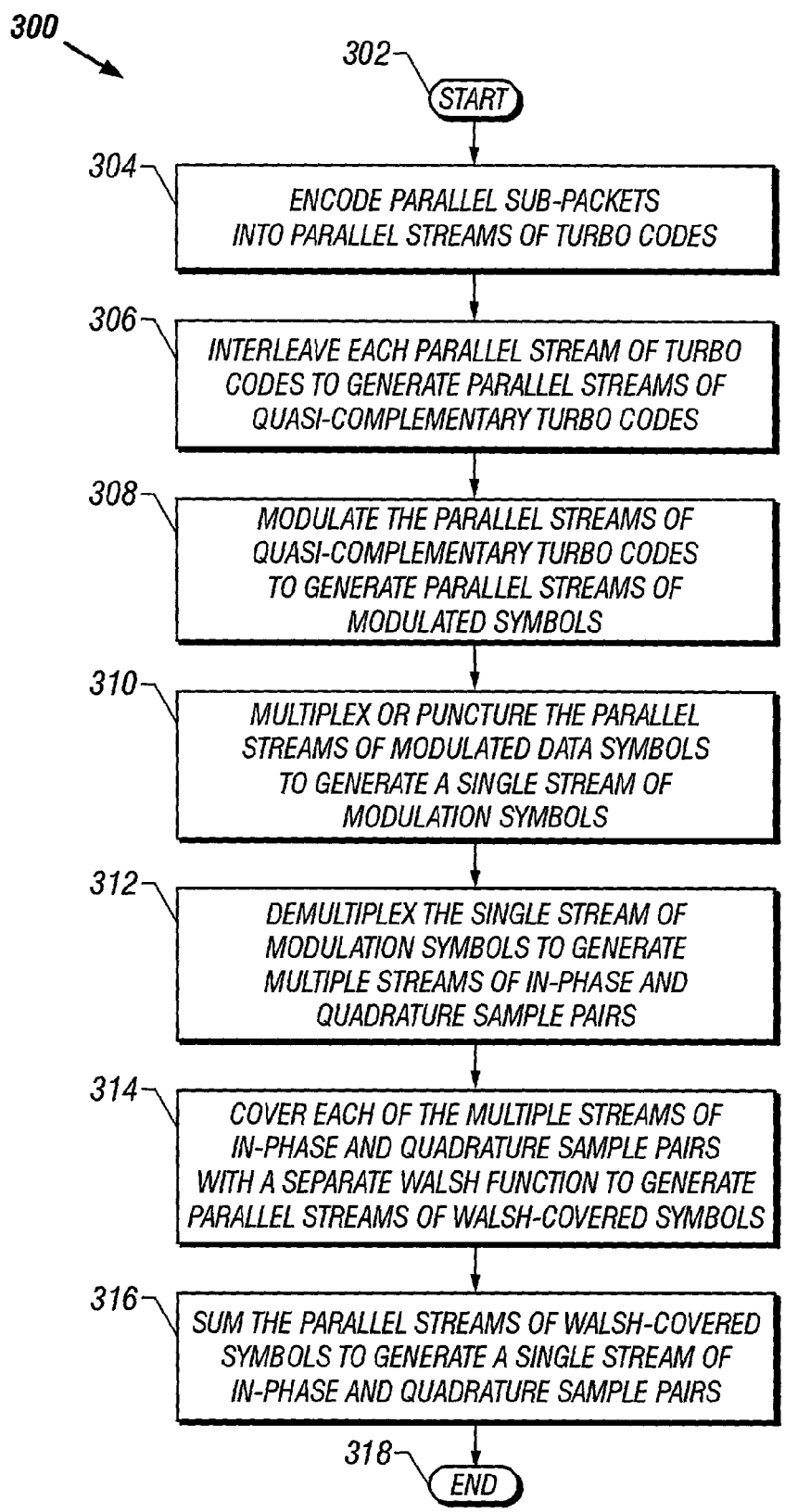
FIG. 3 illustrates a flow chart of a method of time division multiplexing for a forward packet data channel according to an embodiment of the present invention.

FIG. 3 illustrates a flow chart of a method of time division multiplexing for a forward data packet channel according to an embodiment of the present invention.

Step 302 is the entry point of the flow chart 300.

In step 304, parallel sub-packets are encoded into two parallel streams of turbo codes. By way of example, this function may be performed by the turbo encoders 104 and 105 in FIG. 2.

In step 306, each of the parallel streams of turbo codes is interleaved to generate parallel streams of quasi-complementary turbo codes. This function may be performed by the quasi-complementary code interleavers 106 and 107.

In step 308, the parallel streams of quasi-complementary turbo codes are modulated to generate parallel streams of modulated data symbols. This function may be performed by the symbol modulators 108 and 109.

In step 310, the parallel streams of modulated data symbols are multiplexed or combined by non-complete puncturing to generate a single stream of modulation symbols. This function may be performed by the multiplexer/NCP function 202 and the multiplexer/NCP function controller 204.

At this point, a single stream of modulation symbols has been generated for the parallel sub-packets 102 and 103 in accordance with one embodiment of the present invention. The following steps are performed according to well known techniques in the same manner as illustrated in FIG. 1.

In step 312, the single stream of modulation symbols is demultiplexed to generate multiple streams of in-phase and quadrature sample pairs. This function may be performed by the symbol demultiplexer 110.

In step 314, the multiple streams of in-phase and quadrature sample pairs are covered with a separate Walsh function to generate parallel streams of Walsh-covered symbols. This function may be performed, for example, by the Walsh sub-channel cover functions 112.

In step 316, the parallel streams of Walsh-covered symbols are summed to generate a single in-phase and quadrature sample stream. This function may be performed, for example, by the Walsh summer 114 to generate the in-phase and quadrature sample pairs 206.

Step 318 is the exit point for the flow chart 300.

Although the flowchart example described above has been shown with reference to specific steps performed in a specific order, these steps may be combined, sub-divided, or reordered in other embodiments without departing from the scope of the claims. Except as specifically indicated herein, the order and grouping of steps is not a limitation of the present invention.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method of time division multiplexing for a forward data packet channel comprising:

encoding parallel data sub-packets into parallel streams of turbo codes;

interleaving each of the parallel streams of turbo codes to generate parallel streams of quasi-complementary turbo codes;

modulating the parallel streams of quasi-complementary turbo codes to generate parallel streams of modulated data symbols; and multiplexing the parallel streams of modulated data symbols by non-complete puncturing to generate a single stream of modulation symbols, wherein the non-complete puncturing punctures a first set of data sub-packets into a second set of data sub-packets without occupying payload of the second set of data sub-packets.

2. The method of claim 1 further comprising demultiplexing the single stream of modulation symbols into multiple in-phase and quadrature data steams.

3. The method of claim 2 further comprising covering each of the multiple in-phase and quadrature data streams with a distinct Walsh code to generate parallel streams of Walsh-covered symbols.

4. The method of claim 3 further comprising summing the parallel streams of Walsh-covered symbols to generate a single in-phase and quadrature sample stream pair.

5. The method of claim 1 wherein the modulation is one of quadrature phase shift keying, 8-phase shift keying, and 16-quadrature amplitude modulation.

6. A forward data packet channel comprising:

means for encoding parallel data sub-packets into parallel streams of turbo codes;

means for interleaving each of the parallel streams of turbo codes to generate parallel streams of quasi-complementary turbo codes;

means for modulating the parallel streams of quasi-complementary turbo codes to generate parallel streams of modulated data symbols; and means for combining the parallel streams of modulated data symbols by non-complete puncturing to generate a signal stream of modulation symbols, wherein the non-complete puncturing punctures a first set of data sub-packets into a second set of data sub-packets without occupying payload of the second set of data sub-packets.

7. The system of claim 6 further comprising means for demultiplexing the single stream of modulation symbols into multiple in-phase and quadrature sample streams.

8. The system of claim 7 further comprising means for covering the multiple in-phase and quadrature sample streams with a separate Walsh function to generate parallel streams of Walsh-covered symbols.

9. The system of claim 8 further comprising means for summing the parallel streams of Walsh-covered symbols to generate a single in-phase and quadrature sample stream pair.

10. The system of claim 9 wherein the means for modulating comprises one of quadrature phase shift keying, 8-phase shift keying, and 16-quadrature amplitude modulation.

* * * * *